United States Patent Office 3,399,310
Patented Aug. 27, 1968

3,399,310
ELECTRONIC SYNCHRONIZING PULSE TRANSMITTER
Werner Vogler and Heinz Lütge, Erlangen, and Ulrich Michael, Munich, Germany, assignors to Siemens Aktiengesellschaft, Munich, Germany, a corporation of Germany
Filed Oct. 22, 1965, Ser. No. 502,168
Claims priority, application Germany, Mar. 31, 1965, S 96,294
15 Claims. (Cl. 307—108)

Our invention relates to an electronic synchronizing pulse transmitter system for controlling the connection of an alternating-current generator in parallel relation to a power line energized from other alternators.

An alternator can be connected to an alternating-voltage line of a given rated voltage virtually only when the terminal voltage of the alternator is approximately equal to the line voltage; that is, when the frequency difference has attained a negligibly small value, for example 0.5 c.p.s., and the phase difference has become approximately equal to zero.

It is an object of our invention to provide a system for checking these conjointly applicable parallel switching conditions and for releasing a switching command when these conditions are met simultaneously. In view of the time delay inherent in the operation of the switching contactors, the parallel switching command must be given a certain amount of time prior to the moment in which the above-mentioned conditions are conjointly met.

According to our invention, we provide a synchronizing pulse transmitter system with respective circuit means for forming an error voltage proportional to the difference between the line voltage and the alternator voltage, comparing the time spacing of the beat-frequency nodes of the error voltage with the time required for reversing the charge of a capacitor, and releasing a switching command when the nodal time spacing is longer than the entire recharging time of the capacitor, this reverse charging time being so chosen that the corresponding difference frequency is equal to, or smaller than, about 0.5 c.p.s.

According to another feature of our invention, the above-mentioned capacitor of the comparator means is connected, preferably in series with a resistor, to the output of a trigger stage, such as a Schmitt-trigger, which is controlled in dependence upon the error voltage, and the error voltage is derived from the difference voltage by passing the latter through a rectifier and through a smoothing filter, the filter being preferably so dimensioned that alternating-voltage components above a given limit frequency, for example 8 c.p.s., are greatly attenuated, such as in the ratio of 100:1, whereas lower-frequency components of alternating voltage, particularly voltage components having a frequency of about 1 c.p.s., are passed without phase rotation.

As mentioned, the parallel switching command must be issued slightly ahead of the moment when the above-mentioned conditions coincide, to thus take care of the delays inherent in the switching contactors. Accordingly, the switching command must occur slightly prior to the moment of a beat-frequency node. For that reason, and in accordance with a further feature of our invention, we supply to the input of the trigger stage, such as the above-mentioned Schmitt-trigger, not only the output voltage of the smoothing filter, but also a further voltage component which is proportional to the change in filter output voltage and whose amplitude is adjustable.

According to another feature of our invention, the above-mentioned capacitor is charged through a resistor which, preferably together with another resistor, forms a first voltage divider connected parallel to the output transistor of the Schmitt-trigger including its collector resistor. This first voltage divider determines the ultimate potential of the capacitor.

The time constant of the capacitor discharging circuit is to be considerably shorter than the time constant of the capacitor charging operation. To achieve this, we provide a second voltage divider whose tap point is connected through a diode with the tap point of the first voltage divider, and we pole the diode in such a direction that the discharging current from the capacitor can flow through the diode when the output transistor of the Schmitt-trigger stage is turned on.

The switching pulse, constituting the command mentioned above, is preferably furnished from a monostable trigger stage, such as a monostable multivibrator (univibrator), whose timing interval, i.e. the amount of time during which the trigger stage will remain in the instable state, corresponds to the switching interval or delay inherent in the contactors used for connecting the alternator parallel to the line. We have found a univibrator timing interval of about 700 milliseconds to be well suitable. The input voltage for the trigger stage is taken off a second capacitor which is connected to the second voltage divider through a diode poled to permit charging of the second capacitor from the voltage of the second voltage divider. The second capacitor and the resistors in the input circuit of the monostable trigger stage are dimensioned to reach their critical value of response only when the time spacing between two successive beat-frequency nodes, and consequently the time required for the output transistor of the Schmitt-trigger to be fully turned on, attain a given minimum value.

The invention will be further described with reference to an embodiment of an alternator synchronizing control system according to the invention illustrated by way of example on the accompanying drawing in which:

FIG. 4 is a circuit diagram of accessory equipment for use in connection with the system shown in FIGS. 1 and 1a.

Figure 1:
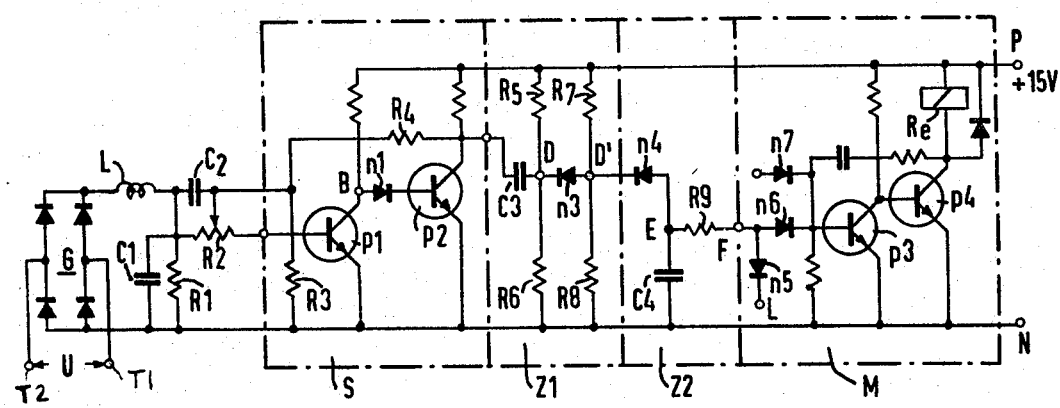
FIG. 1 is a circuit diagram of the synchronizing pulse transmitter system.
Figure 1A:
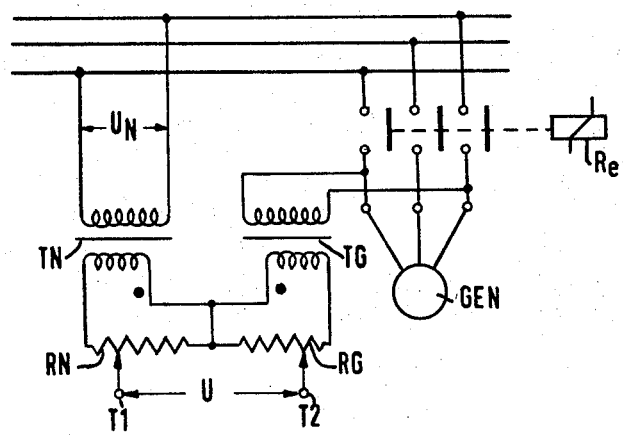
FIG. 1a is an example of circuit details connected with the system of FIG. 1 for deriving a difference or error voltage from the line voltage and the alternator voltage and for performing the parallel switching operation in response to the synchronizing command.

Referring to FIG. 1, there is denoted by G a rectifier in bridge connection to whose input terminals T1 and T2 an alternating voltage U is supplied. The voltage U is proportional to the difference between the voltage $U_N$ of an alternating-voltage line and the terminal voltage of an alternator GEN (FIG. 1a) which is to be switched onto the line by a contactor under control by a coil or relay Re shown in FIG. 1 as well as in FIG. 1a. The difference voltage U is formed, for example, with the aid of two step-down transformers TN and TG connected with the line voltage $U_N$ and the voltage of the alternator respectively. The secondary windings of the two transformers are connected to respective resistors RN and RG in series-opposed phase relation to each other. The above-mentioned input terminals T1 and T2 of the rectifier G (FIGS. 1 and 1a) thus receive an error voltage proportional to the difference between line voltage and alternator voltage.

The difference or error voltage U constitutes a cosine oscillation whose frequency corresponds to that of the line voltage in one of the possible limit cases. Superimposed upon this cosine oscillation is a sine oscillation of one-half of the difference frequency. Consequently, the voltage at the direct-voltage output terminals of rectifier G has a pulsating characteristic with periodically recurring zero intervals.

Since the system is to determine the amount of time elapsing between two successive beat-frequency nodes, it is necessary to provide for suitable smoothing in order to suppress the zero spots that do not stem from one of the beat-frequency nodes. This purpose is served by a voltage divider composed of a throttle coil L and a capacitor C1. This reactive voltage divider is rated to have alternating-voltage components above a given limit frequency, for example above 8 c.p.s., very strongly attenuated, such as in the ratio of about 100:1, whereas alternating-voltage components of lower frequency, particularly those in the order of about 1 c.p.s., are permitted to pass through without phase rotation.

Connected parallel to the capacitor C1 is a resistor R1 through which the capacitor C1 can discharge. The voltage of capacitor C1 is applied through a resistor R2 and a parallel connected capacitor C2 to the input terminal A of a Schmitt-trigger stage S. Due to the insertion of capacitor C2, the input A receives a current composed of two components, namely a component current proportional to the voltage at capacitor C1, and also a share of current proportional to the change of the capacitor voltage. The resultant current, therefore, attains the critical threshold value of the trigger stage S prior to the occurrence of the beat-frequency nodes proper, that is prior to the occurrence of the voltage zero point at the capacitor C1. This advanced timing is required in view of the inherent delay of the contactor employed for the parallel switching of the alternator, if the switching is to take place with a satisfactory degree of accuracy at the moment of the beat-frequency node. The amount of advanced timing can be adjusted at resistor R2.

The Schmitt-trigger stage S comprises two amplifier stages equipped with transistors $p1$ and $p2$ and coupled through a diode $n1$. The trigger stage exhibits a pronounced hysteresis. The voltage at the output C is feedback connected to the input A through a voltage divider formed of resistors R3 and R4. As long as the current or voltage at the input A is above a given limit value $a$, the transistor $p1$ is fully turned on and the transistor $p2$ is turned off. If the input signal drops below this limit value, the transistor $p1$ is turned off and transistor $p2$ is turned on. This performance occurs abruptly on account of the feedback coupling. When thereafter the input voltage again rises above the limit value $a$, the transistor $p1$ is again turned on and the transistor $p2$ is turned off.

Figure 2:
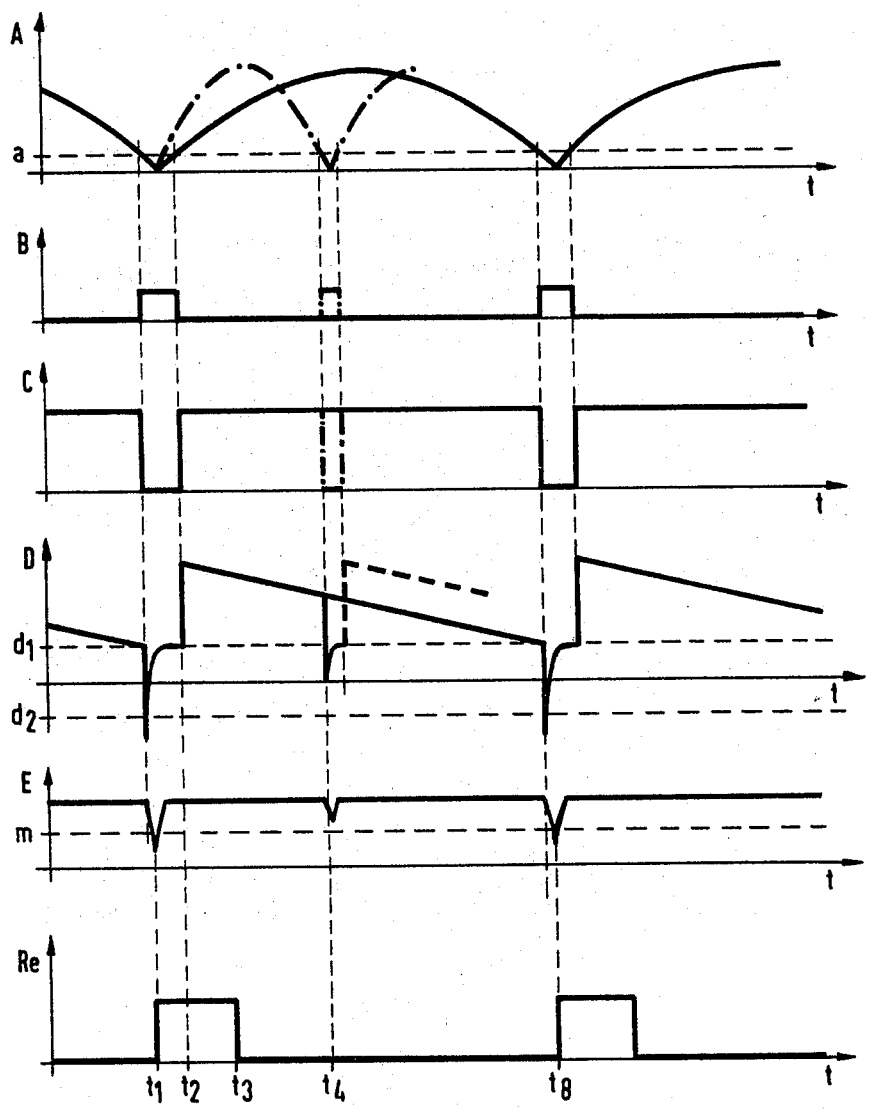
FIGS. 2 and 3 are explanatory graphs relating to the operation of the synchronizing pulse transmitter according to FIG. 1.

FIG. 2 represents the voltages at the circuit points A and B (collector of transistor $p1$) and C. The abscissas in FIG. 2 denote time ($t$) and the ordinates denote voltage amplitudes. It will be seen that the output C of the trigger stage S maintains a constant voltage which drops to zero for short intervals of time only in the vicinity of the beat-frequency nodes.

As explained above, a switching command is to be issued only when the time spacing between two beat-frequency nodes becomes equal to, or larger than, a given limit value, for example two seconds. This time is measured by a timing stage Z1. This stage comprises a first voltage divider formed of resistors R5 and R6, and a second voltage divider formed of resistors R7 and R8. The ohmic resistance value of the second voltage divider is considerably lower than that of the first voltage divider. The tap point D of the first voltage divider is connected by a capacitor C3 with the output C of the trigger stage S. This capacitor C3 constitutes the main capacitor of the comparator used for comparing the nodal spacing with the charging period and for issuing the switching command when the nodal spacing becomes longer than the charging period. The tap D is further connected through a diode $n3$ with the tap point D' of the second voltage divider. The diode $n3$ is so poled that the capacitor C3 can discharge through diode $n3$ and resistor R8 when the transistor $p2$ is turned on.

The first voltage divider, formed by resistors R5 and R6, may be so dimensioned, for example, that upon completed charging of the capacitor C3 the potential $d1$ of tap point D is 5 volt at a feeder direct voltage of 15 v. When the transistor $p2$ is turned off, the point C in the stationary state is at a potential of +15 v., so that a voltage of 10 v. is impressed upon the capacitor C3, point C being positive relative to point D. When now the trigger stage S is triggered in the vicinity of a beat-frequency node, thus turning transistor $p2$ on, then the capacitor C3 becomes effective in parallel to resistor R6 and to the series connection of R8 and $n3$. A negative pulse, therefore, occurs at the output D' of the timing stage Z1. This pulse is relatively short because the resistance of R8 is small relative to the resistance of R6.

Figure 3:
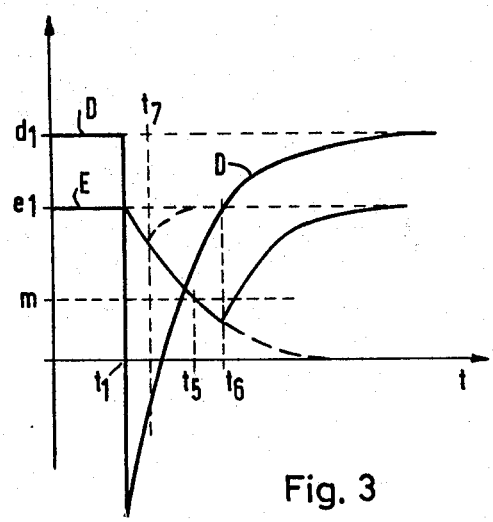

The time curve of the short pulse is shown in FIGS. 2 and 3. It commences at the moment $t_1$ or $t_8$. The discharging time constant is very small in comparison with the charging time constant. The difference in dimensioning is necessary because otherwise the potential of point D at the beginning of each charging period of capacitor C3 would be slightly lower than before so that a switching command would issue irrespective of the time spacing between the beat-frequency nodes.

As soon as, at the moment $t_2$, the transistor $p_2$ is again turned off, the potential of point D jumps from the value $d_1$ up to a value which, for a small collector resistance of $p_2$ virtually corresponds to the value of the feeder voltage (+15 v.). The capacitor C3 is charged through resistor R6, and the potential of point D declines gradually. If the trigger stage S during this charging operation is reversely triggered by the next following beat-frequency node (see moment $t_4$ in FIG. 2), then another negative pulse occurs at R6. As will be seen from FIG. 2, however, this second negative pulse decreases with the shortening of the time spacing between two successive switching operations of the trigger stage S and hence with a decreasing time spacing between successive beat-frequency nodes.

The voltage of the tap point D' is supplied through another timing stage Z2 to a monostable trigger stage M. The latter stage is shown to be a conventional monostable multivibrator. It controls a relay or contactor Re (FIGS. 1, 1a) which is excited when the voltage of the input F (FIG. 1) temporarily drops below a given threshold value $m$.

As soon as this occurs, the stage M triggers. Its transistor $p3$ is turned off and its transistor $p4$ turned on. This instable state persists for a given interval of time determined by the time constant of the feedback member in the trigger stage. The duration of the timing interval is set to essentially correspond to the inherent delay of the contactor to be controlled and amounts to approximately 700 millisecond, for example, In principle, the voltage of point D' could be directly applied to the input F. As will be seen from the fourth line (D-graph) in FIG. 2, the monostable trigger stage M would then be triggered to its instable state only if a given minimum interval of time ($t_8-t_1$) has elapsed between two successive voltage nodes. If the beat-frequency nodes follow more closely upon each other (for example already at the moment $t_4$), then the magnitude of the negative pulse at D' is not sufficient to block the transistor $p3$ and hence to trigger the stage M.

This is the reason why the embodiment illustrated in FIG. 1 is provided with a second timing stage Z2. This stage has a capacitor C4 connected through a diode $n4$ in parallel relation to the resistor R8. The junction point E between C4 and $n4$ is connected through a resistor R9 with the input of the monostable trigger stage M.

This timing stage Z2 serves the following purpose: During start-up of an alternator, which may last several minutes, the input A is at first supplied with a smooth direct voltage derived from the alternating volage of the power line. In time, the frequency as well as the amplitude of the voltage generated by the alternator increases. At first, the resulting beat-frequency is so large that the filter virtually fully compensates for the periodic variations. However, as the frequency of the alternator voltage more closely approaches the line voltage, the beat-frequency of the difference voltage decreases. It will be recognized, therefore, that after the alternator is switched into operation, there still elapses a relative long period of time until the voltage at the input A of the Schmitt-trigger S will reach its critical trigger threshold for the first time. During this preceding period, the capacitor C3 in the timing stage Z1 could charge up to the maximal voltage at which the potential of the tap point D has the value $d1$. This state of events has the consequence that the first response of the trigger stage S, irrespective of the actual time spacing between the beat-frequency nodes and hence irrespective of the difference frequency, will result in issuing a pulse whose amplitude suffices to trigger the monostable stage M. Thus a switching command would be given at a moment when there still exists an appreciable difference between the respective frequencies of the line voltage and alternating voltage.

Such a premature switching command is undesired and is prevented by the interposed timing stage Z2. Its functioning will be explained with reference to FIG. 3 showing the time curve of the voltage at the tap points D and E. In effect, the diagram of FIG. 3 constitutes an enlarged portion of the fourth and fifth graphs (for D and E) shown in FIG. 2, the same reference characters being applied in both illustrations.

In FIG. 3, there is shown the moment $t_1$ at which the input voltage A of the Schmitt-trigger S attains the critical threshold value $a$. Assume that the length of time between the starting of the alternator and the moment $t_1$ is longer than the time spacing between two beat-frequency nodes at a frequency of 0.5 c.p.s. In this case, point D has the potential $d1$ and point E the potential $e1$, the latter being lower than the potential of point D' by the amount of the threshold value of diode $n4$. The potential of point D' is determined by the voltage divider R7–R8 which is so rated that the potential of point D' is lower than the potential $d1$, by the threshold value of diode $n3$. The potential $e1$ consequently is lower than the potential $d1$ by the threshold values of diodes $n3$ and $n4$.

At the moment $t_1$, the potential of points D and D' jumps for a short interval of time to a negative value and thereafter rises toward the value $d1$ with a time constant determined by capacitor C3 and the parallel connection of resistors R6 and R8. During such rise, the diode $n4$ is blocked so that C4 discharges through R9 and through the input resistance of trigger stage M. The trigger stage M is triggered only when the voltage $e1$ drops below the critical threshold value $m$ which, in FIG. 3, is shown to occur at the moment $t_5$.

During starting-up of the alternator, the time spacing between two successive beat-frequency nodes initially is very small (the difference frequency being high). This has the consequence that stage S is triggered to its other state already at the moment $t_7$ shortly after the moment $t_1$. Such triggering has the effect of blocking the transistor $p^2$ so that the discharging current through R8 is interrupted and diode $n3$ converts to blocking condition. However, the diode $n4$ becomes conductive so that the potential $e1$ commences to increase already from the moment $t^7$ although the critical threshold value $m$ has not been reached.

At a beat-frequency equal to, or smaller than, 0.5 c.p.s. the transistor $p2$ is turned off and transistor $p1$ remains turned on until the input voltage of the trigger stage M, with a suitable rating of the timing stage Z2, has reliably dropped below the threshold value $m$.

In practice, there occurs an operating condition which the design of the synchronizing pulse transmitter must also take into account. That is, when the power line voltage is absent, the alternator should be switched onto the line as fast as feasible after the alternator terminal voltage has reached a given fraction, usually at least 85%, of the rated line voltage. Consequently, the pulse transmitter should be capable of issuing a switching command when the two just-mentioned conditions are satisfied, namely, when the line voltage is equal to zero and simultaneously the alternator voltage has reached 85% of the rated voltage.

Figure 4:
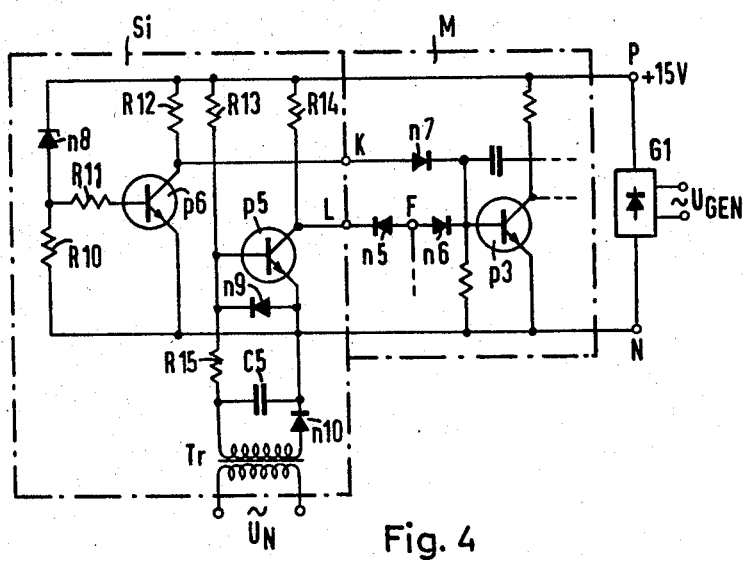

For this purpose, the monostable trigger stage M in FIG. 1 is supplied through the inputs K and L with an auxiliary signal from an accessory signal transmitter as exemplified by FIG. 4 and discribed presently.

Shown in FIG. 4 is the circuitry of the accessory signal transmitter S$i$ together with the input circuits of the monostable trigger stage M (FIG. 1). The feeder voltage for the signal transmitter and the entire synchronizing pulse transmitter according to FIG. 1 is supplied from a rectifier G1 energized by the alternator voltage $U_{Gen}$. It will be understood that the auxiliary signal transmitter S$i$ is to be interposed between the timing stage Z2 and the trigger stage M in a system otherwise as shown in FIG. 1 and described above. Consequently, the stages S, Z1 and Z2 of the system shown in FIG. 1 remain unchanged and the output terminal F of the stage Z2 is understood to be connected to the input terminal F as shown in FIG. 4.

The magnitude of the feeder voltage furnished from the rectifier G1 and applied between the terminals P and N is checked with the aid of a transistor $p6$ whose emitter-collector path is connected through a resistor R12 between the terminals P and N. The base of the transistor $p6$ is connected through a resistor R11 to the tap of a voltage divider formed by a Zener diode $n8$ and a resistor R10. The collector of transistor $p6$ is connected to the input terminal K of the trigger stage M. The rating of the circuit components is such that the transistor $p6$ is turned on only when the alternator voltage attains the predetermined limit value, for example 85% of its rated value. As long as this condition is not met and the transistor $p6$ is turned off, the input transistor $p3$ of the trigger stage M receives through R12 and $n7$ a base current which prevents the issuance of a synchronizing command by means of signals supplied through the terminals F or L.

The issuance of a switching command, however, is also prevented when the line voltage is missing. This is done by means of a control current which is supplied to the transistor $p3$ through the terminal F (R7, $n4$, R9 and $n6$; see FIG. 1). This current, therefore, must bypass the emitter-base path of transistor $p3$ if a switching command is to be released when the line voltage fails or is missing.

Such a bypass is provided with the aid of a transistor $p5$ through whose emitter-collector path the input L is connected with the terminal N. The collector and the base are connected through respective resistors R-14 and R-13 with the positive terminal P. The control voltage for the transistor $p5$ is derived from the line voltage $U_N$ through a smoothing filter R15, C5. Connected to the output of this smoothing filter is a diode $n9$ poled in the forward direction. The emitter-base path of the transistor $p5$ lies in parallel to the diode $n9$ so that the transistor $p5$ is turned off by the voltage drop at the diode. The components are rated to keep transistor $p5$ turned off as long as the line voltage $U_N$ is present. In this case, the diode $n5$ is stressed in the blocking direction, A parallel switching command, therefore, can be released by a voltage passing through the terminal F, only under the condition that the time spacing between successive beat-frequency nodes exhibits the predetermined minimum value.

However if the line voltage $U_N$ fails and if under this condition the alternating voltage has reached the predetermined minimum value, then the transistor $p3$ of the trigger stage M no longer receives control current. This causes a triggering of stage M and consequently the issuance of a switching command.

To those skilled in the art it will be obvious upon a study of this disclosure that with respect to details and circuitry as well as the particular type and number of components employed, the invention permits of a great variety of modifications and may be given embodiments other than particularly illustrated and described herein, without departing from the essential features of our invention and within the scope of the claims annexed hereto.

We claim:

1. An electronic synchronizing pulse transmitter for controlling the parallel switching of an alternator onto an alternating-current line, comprising error voltage supply means for supplying a beat-frequency voltage corresponding to the difference between line voltage and alternator voltage, a capacitor circuit having a capacitor and having means connected to said capacitor for reversely charging it within a given total reverse charging period corresponding to a beat-frequency of not more than about 0.5 c.p.s., comparator means connected to said error voltage supply means and said capacitor circuit means for comparing the time spacing of the beat-frequency nodes of said error voltage with said charging period, and pulse release means connected to said comparator means for releasing a switching command in response to said node spacing being longer than said total reverse charging period of said capacitor.

2. An electronic synchronizing pulse transmitter according to claim 1, comprising a trigger circuit connected to said error voltage supply means to be controlled in dependence upon said voltage difference, and a resistor connected in series with said capacitor to the output of said trigger circuit.

3. An electronic synchronizing pulse transmitter according to claim 2, said error voltage supply means comprising a rectifier and a smoothing filter member, said member being connected between said rectifier and the input of said trigger circuit.

4. An electronic synchronizing pulse transmitter according to claim 3, comprising circuit means connected between the output of said filter member and the input of said trigger circuit for supplying to said trigger circuit a component trigger control voltage proportional to the change of said output voltage of said member, said circuit means having means for adjusting the magnitude of said component control voltage.

5. In an electronic synchronizing pulse transmitter according to claim 3, said smoothing filter member being a low pass filter and having an attenuation down to a lower decimal order of magnitude for alternating-voltage components above a given limit frequency and being passable substantially without phase rotation for voltage components below said limit frequency.

6. In an electronic synchronizing pulse transmitter according to claim 3, said smoothing filter member having an attenuation in the approximate ratio of 100:1 for alternating-voltage components above an approximate limit frequency of 8 c.p.s., and being passable with zero phase rotation for alternating voltage components in the vicinity of 1 c.p.s.

7. In an electronic synchronizing pulse transmitter according to claim 3, said trigger circuit being a Schmitt-trigger having an output-stage transistor with a collector resistor, a first voltage divider connected parallel to said transistor and its collector resistor, said voltage divider having a tap, and said capacitor being connected between the output of said Schmitt-trigger and said tap.

8. An electronic synchronizing pulse transmitter according to claim 7, comprising a second voltage divider connected parallel to said first voltage divider and having another tap, a diode interconnecting said two taps and poled to pass discharge current from said capacitor when said transistor is turned on.

9. An electronic synchronizing pulse transmitter according to claim 8, comprising a contactor for switching the alternator onto said alternating current line in response to said switching command, said contactor having an inherent switching interval of delay elapsing from receipt of said command to completion of the switching operation and a monostable multivibrator stage interposed between said second voltage divider and said contactor and having a timing interval corresponding substantially to said contactor interval of delay, said monostable stage being controlled by the voltage of said other tap.

10. An electronic synchronizing pulse transmitter according to claim 9, comprising a second capacitor and a diode connected in series with each other to said other tap and jointly in parallel to part of said second voltage divider, said latter diode being poled for charging said second capacity by the voltage tapped from said second voltage divider, said monostable stage having an input circuit with resistance means connected to said second capacitor; said second capacitor and said resistance means being dimensioned to have said monostable stage reach its trigger voltage when the time spacing between two beat-frequency nodes reaches a given minimum value.

11. An electronic synchronizing pulse transmitter according to claim 9, comprising control circuit means connected to said monostable multivibrator stage and having means responsive to the line voltage and means responsive to the alternator voltage for triggering said stage when at zero line voltage said alternator voltage has reached a given minimum value.

12. An electronic synchronizing pulse transmitter according to claim 11, wherein said given minimum value of alternator voltage is approximately 85% of the rated voltage.

13. In an electronic synchronizing pulse transmitter according to claim 11, said control circuit means comprising a signal transmitter and a diode through which said transmitter is connected to the input of said monostable stage for supplying to said stage a control current as long as the alternator voltage is below said given minimum value.

14. In an electronic synchronizing pulse transmitter according to claim 11, said control circuit means comprising signal transmitting means connected to the input of said monostable stage for supplying to said stage a control current as long as the alternator voltage is below said given minimum value, another transistor having an emitter-collector path, a diode connected in series with said path, said line voltage responsive means being in controlling connection with said latter transistor for turning it on to conduct said control current away from said monostable stage upon failure of the line voltage.

15. An electronic synchronizing pulse transmitter according to claim 1, comprising direct-voltage feeder means for said capacitor charging means and said comparator means and said pulse release means, said feeder means having rectifier means and smoothing filter means connected to the generator voltage to be energized therefrom.

References Cited

UNITED STATES PATENTS

| | | | |
|---|---|---|---|
| 2,777,075 | 1/1957 | Moynihan | 307—87 |
| 2,781,457 | 2/1957 | Urban | 307—87 |
| 2,817,023 | 12/1957 | Rice | 307—87 |
| 2,838,685 | 6/1958 | Stineman | 307—87 |
| 3,097,341 | 7/1963 | Bennett | 307—108 X |
| 3,325,650 | 6/1967 | Barnes | 307—87 X |

ROBERT K. SCHAEFER, Primary Examiner.

H. J. HOHAUSER, Asssitant Examiner.